United States Patent
Thomson et al.

(10) Patent No.: US 6,945,833 B2
(45) Date of Patent: Sep. 20, 2005

(54) FLUID THRUST ASSEMBLY WITH SELF-ALIGNING THRUST BEARINGS

(75) Inventors: George A. Thomson, Burlington (CA); Keith Laskey, Cambridge (CA)

(73) Assignee: Thordon Bearings Inc., Burlington (CA)

( * ) Notice: Subject to any disclaimer, the term of this patent is extended or adjusted under 35 U.S.C. 154(b) by 10 days.

(21) Appl. No.: 10/795,355

(22) Filed: Mar. 9, 2004

(65) Prior Publication Data

US 2004/0195275 A1 Oct. 7, 2004

Related U.S. Application Data

(60) Provisional application No. 60/453,943, filed on Mar. 13, 2003.

(51) Int. Cl.[7] .............................................. B63H 11/00
(52) U.S. Cl. .......................................... 440/38; 440/83
(58) Field of Search .............................. 440/38, 47, 82, 440/83; 416/244 A, 244 B, 223, 246, 245 R, 244 R, 174

(56) References Cited

U.S. PATENT DOCUMENTS

| 4,319,790 A | 3/1982 | Thomson | |
| 5,266,009 A | 11/1993 | Tasaki et al. | 416/223 R |
| 6,193,570 B1 | 2/2001 | Ishigaki | 440/38 |
| 6,287,162 B1 | 9/2001 | Freitag et al. | 440/82 |
| 6,293,836 B1 | 9/2001 | Blanchard | 440/47 |
| 6,302,047 B1 | 10/2001 | Cannon | 114/164 |
| 6,358,107 B1 * | 3/2002 | Roos | 440/83 |
| 6,875,067 B2 * | 4/2005 | Tornblad et al. | 440/83 |

* cited by examiner

Primary Examiner—Jesus D. Sotelo

(57) ABSTRACT

A thrust bearing assembly is described that includes a self-aligning thrust bearing used in fluid thrust assemblies where the thrust may become unevenly distributed, e.g. in a water jet propulsion unit. The thrust bearing is designed to be lubricated by water and to be self-aligning against uneven thrust forces applied to it. The self-alignment is achieved by the design of the bearing, which is in the form of an annular multi-layer plate. The bearing plate comprises a metallic central core layer, an interface layer of marine bearing material on one side of the core and a flexible backing layer on the other side of the core. The backing layer supports the thrust flange against a support face and is formed of a high resilience polymer material capable of being deformed under thrust action sufficiently to align the thrust bearing to correct for uneven thrust.

9 Claims, 6 Drawing Sheets

FLUID THRUST ASSEMBLY WITH SELF-ALIGNING THRUST BEARINGS

CROSS REFERENCE TO RELATED APPLICATION

This application claims the benefit of U.S. Provisional Application No. 60/453,943, filed Mar. 13, 2003.

FIELD OF THE INVENTION

This invention relates to thrust bearing assemblies, and in particular, self-aligning thrust bearings used in fluid thrust assemblies where the thrust may become unevenly distributed.

DESCRIPTION OF THE PRIOR ART

Fluid thrust assemblies are being widely used as a source power, e.g. for propelling pleasure watercraft and ocean vessels. In a typical watercraft jet propulsion system, an impeller is mounted on a drive shaft and installed in a housing, the interior surface of which defines a water tunnel. The drive shaft is connected to a motor so that with the motor in operation, the rotating impeller impels the water rearward through the water tunnel. Reaction forces propel the watercraft forward.

One example of such water jet propulsion unit can be found in Blanchard, U.S. Pat. No. 6,293,836, issued Sep. 25, 2001. A bearing arrangement for water jet power systems is shown in Freitag et al U.S. Pat. No. 6,287,162, issued Sep. 11, 2001. This patent shows both forward and aft thrust bearings mounted on each side of a radial flange fixed to a drive shaft. No details are given of these thrust bearings and they are described only as "thrust washers".

Even though the water tunnel of a jet propulsion system includes vanes for directing water flow, with increasing water flows and thus increasing thrust, the thrust within the system tends to become unevenly distributed. This uneven thrust distribution results in an uneven load on the thrust bearings causing uneven wear. It is an object of the present invention to provide a means for a thrust bearing to self-correct its alignment in response to unbalanced thrust forces causing misalignment.

SUMMARY OF THE INVENTION

The present invention in its broadest aspect relates to a fluid thrust apparatus comprising a flow-through housing having a fluid inlet and a fluid outlet nozzle and a central axial pod mounted within the flow-through housing. A first portion of the pod comprises a fixed hub supported in the housing and surrounded by an annular fluid flow passage and a second portion of the pod comprises an impeller mounted on a drive shaft with an end of the drive shaft rotatably mounted within the fixed hub. The impeller forces fluid along the annular flow passage and out the fluid outlet nozzle causing a reaction force. The drive shaft is supported for rotation in a sleeve bearing within the fixed hub and the drive shaft also includes a radial flange that engages a thrust bearing mounted in the fixed hub.

The thrust bearing is designed to be lubricated by water and to be self-aligning against uneven thrust forces applied to it. The self-alignment is achieved by the design of the bearing, which is in the form of an annular multi-layer plate. The bearing plate comprises a metallic central core layer, an interface layer of marine bearing material on one side of the core and a flexible backing layer on the other side of the core. The backing layer supports the thrust flange against a support face and is formed of a high resilience polymer material capable of being deformed under thrust action sufficiently to align the thrust bearing to correct for uneven thrust.

The fluid thrust apparatus of this invention is preferably in the form of a water jet propulsion system for a watercraft, such as a personal watercraft or an ocean-going ship. For this purpose, typically two thrust bearings are used, a forward thrust bearing and an aft thrust bearing. The interface bearing layer preferably includes a series of radial grooves to carry a flow of lubricating water for dispersal between the bearing face and an axially engaging rotating face.

DESCRIPTION OF THE PREFERRED EMBODIMENTS

Figure 1A:
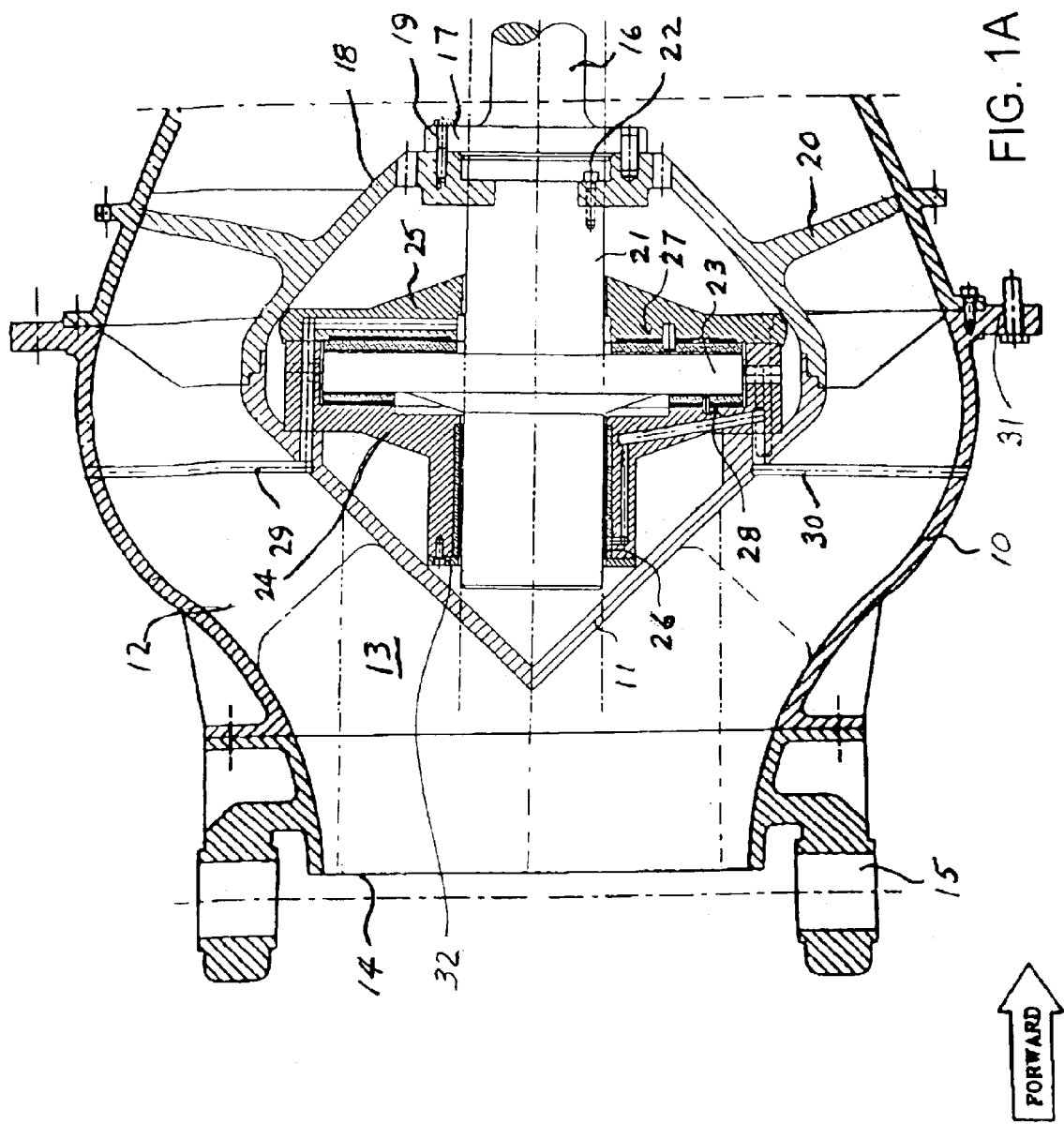
FIG. 1A is a sectional view along a horizontal plane of a water jet apparatus incorporating the invention.
Figure 1B:
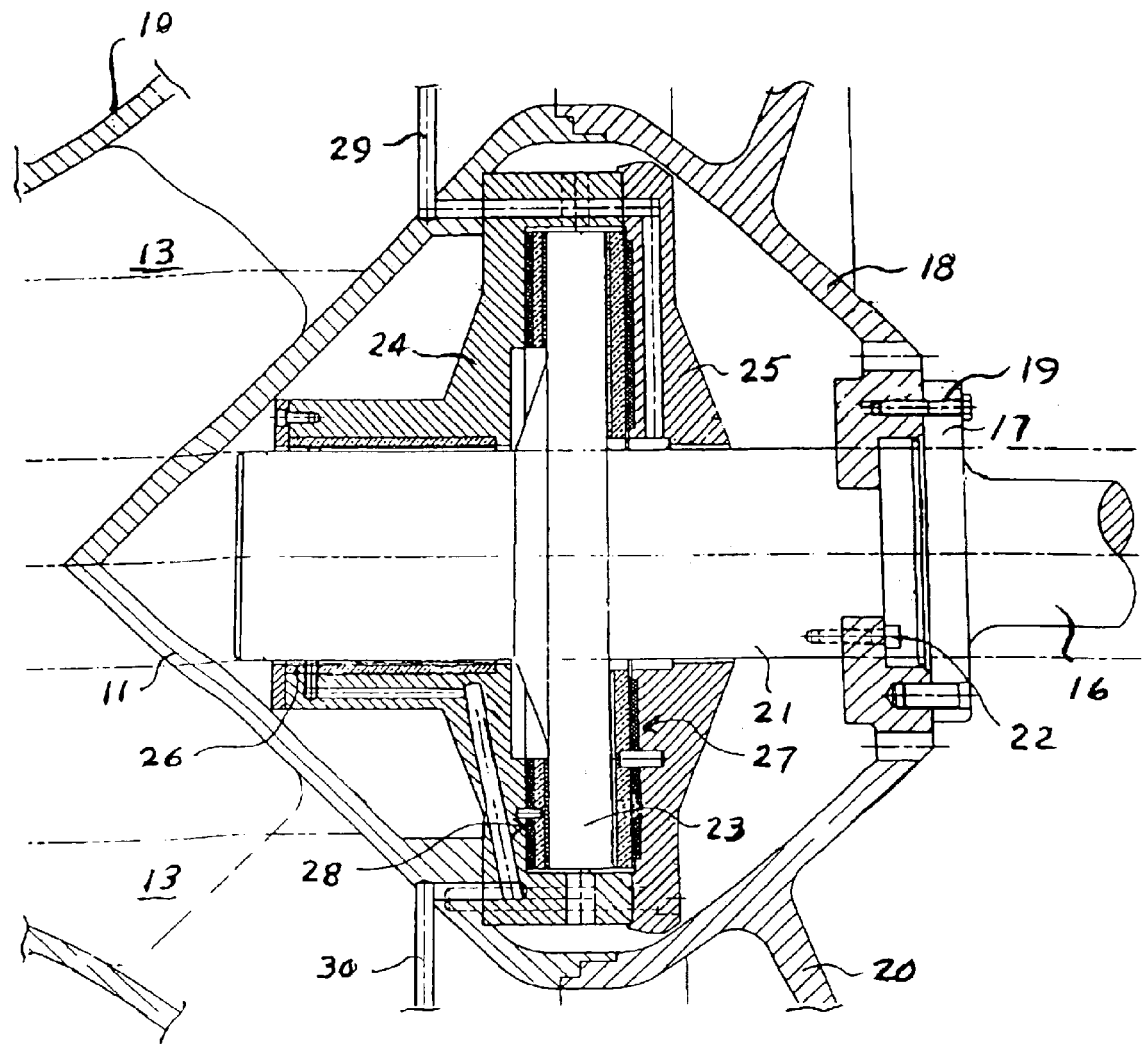
FIG. 1B is a sectional view along a horizontal plane showing thrust bearing assemblies in greater detail.
Figure 2:
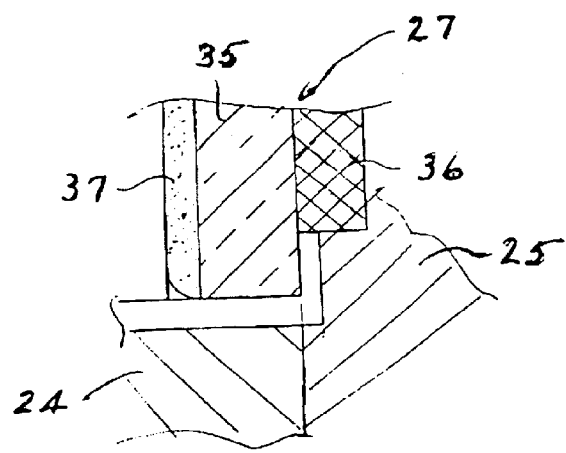
FIG. 2 is a sectional view showing details of a thrust bearing assembly.
Figure 4:
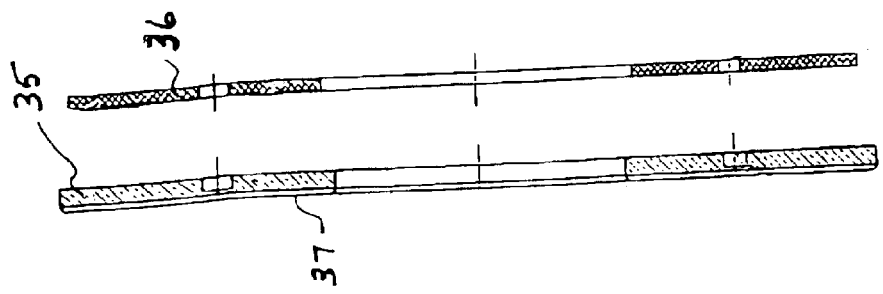
FIG. 4 is a sectional view along line 4—4 of FIG. 3.
Figure 5:
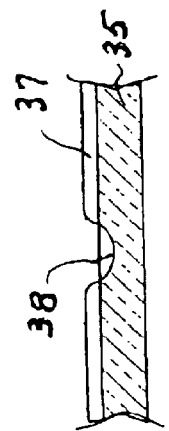
FIG. 5 is a sectional view along line 5—5 of FIG. 3.
Figure 3:
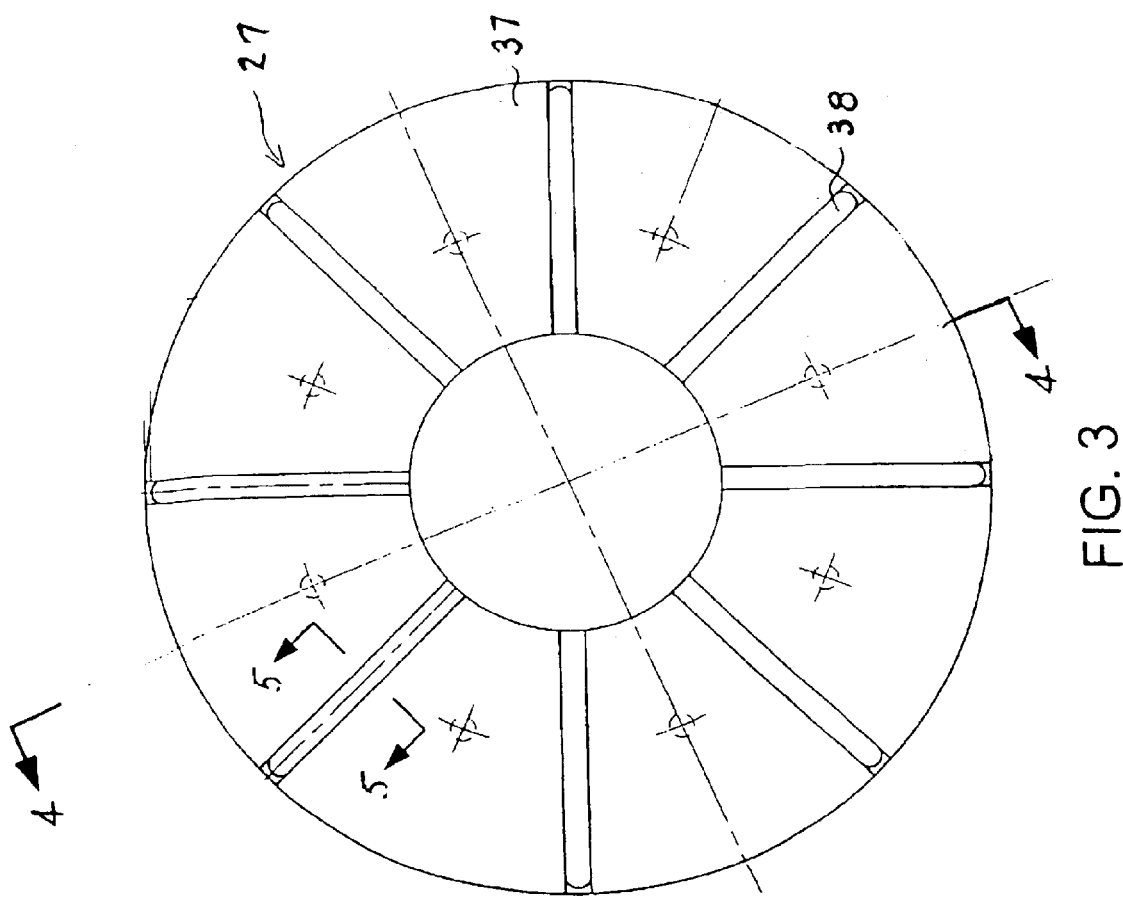
FIG. 3 is a plan view of a thrust bearing.

A water jet assembly is shown in FIGS. 1A and 1B having an outer housing 10 within which are axially mounted a fixed hub 11 and a rotatable impeller 18. The fixed hub 11 is cone shaped in the aft direction and is rigidly held within the housing 10 by axially directed vanes 12 extending between the inner face of the outer wall 10 and the fixed hub 11. These vanes also serve as flow guides for water being propelled through the annular channel 13 and out through aft discharge nozzle 14. Flanges 15 serve for connecting a steering nozzle (not shown).

The fixed hub 11 holds a support assembly for thrust bearings comprising annular housing 24 that is bolted to the fixed hub 11. At the forward end of the assembly, a drive shaft 16 is shown powered by a motor (not shown). A flange 17 on the end of the drive shaft is bolted to impeller 18 by bolts 19. This impeller includes blades 20 that rotate with the drive shaft within the outer wall 10.

Figure 10:
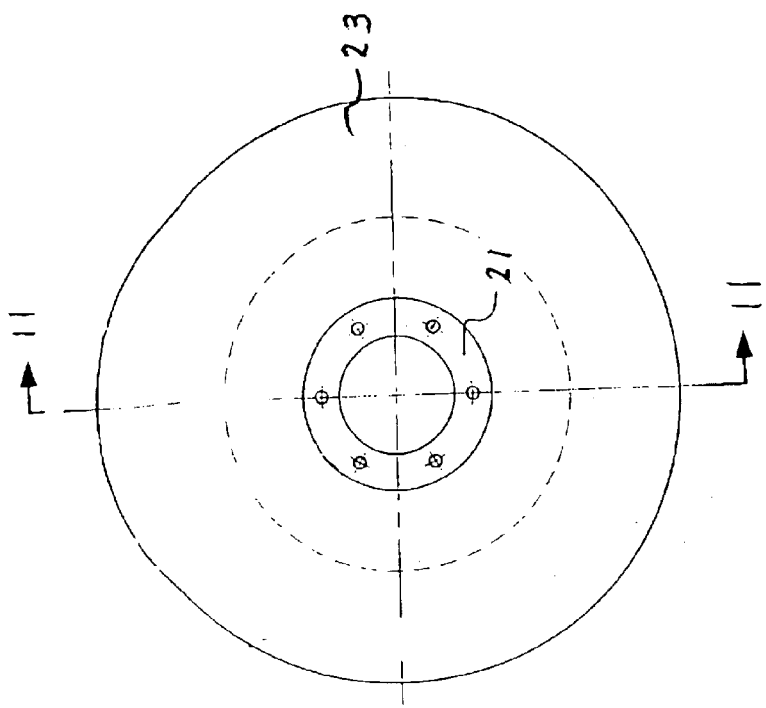
FIG. 10 is an end view of a drive shaft extension and thrust flange.
Figure 11:
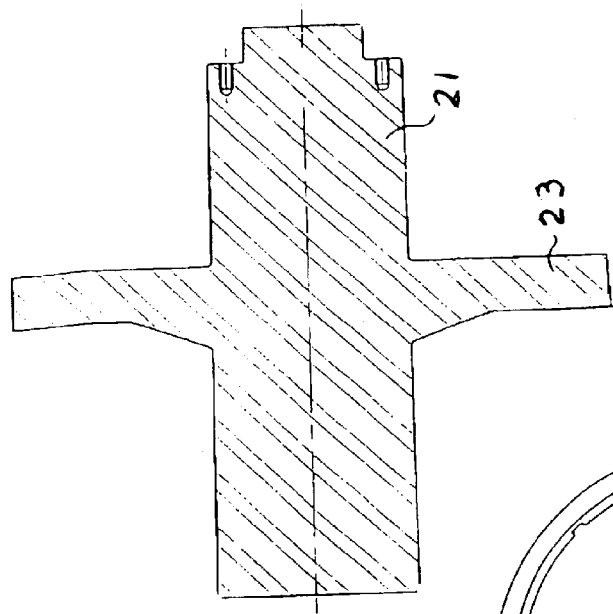
FIG. 11 is a sectional view through line 11—11 of FIG. 10.

A drive shaft extension 21 with an annular thrust flange 23 formed integrally therewith (which can be seen in greater detail in FIGS. 10 and 11) is fixed axially on the end of drive shaft by way of bolts 22. The shaft extension 21 passes through an annular plate 25 on the forward side of flange 23 and passes through annular support housing 24 on the aft side of the flange 23. A sleeve bearing 26 is mounted between the shaft extension 21 and annular housing 24, this sleeve bearing being typically of the type shown in U.S. Pat. No. 4,319,790.

The annular housing 24 and annular plate 25 are also bolted together to provide mounting recesses for forward thrust bearing 27 and aft thrust bearing 28. In normal operation water is being discharged out through nozzle 14 thereby creating a forward thrust against the impeller. This forward thrust is transferred to the ship transom via rotating flange 23 reacting against thrust bearing 27 and annular plate 25, which carries the load to flange 31 attached to the ship transom. Thrust against thrust bearing 28 will occur during unpowered rotation or during reverse rotation of the unit.

The forward thrust bearing 27 is shown in detail in FIGS. 2 to 5, the bearing being formed of three annular layers joined together. These include a central bronze core 35, and a front bearing face 37 formed of a polymeric marine bearing material, e.g. an elastomeric thermosetting resin available under the trademark THORDON SXL as described in U.S. Pat. No. 4,319,790, incorporated herein by reference. This bearing front face has a series of radial grooves 38 providing flow passages for lubricating water fed from feed line 29 shown in FIG. 1B. The back face of bearing 27 is a layer of high resilience polymer 36 that has sufficient resilience to allow for correction of misalignments between the thrust flange 23 and the support plate 25. This is typically cast elastomeric polymer material available under the trademark THORFLEX.

Figure 7:
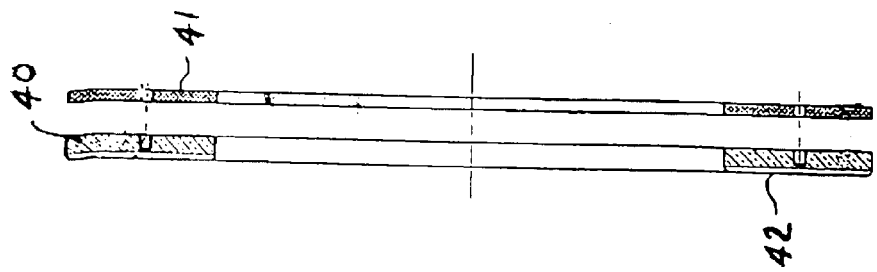
FIG. 7 is a sectional view along line 7—7 of FIG. 6.
Figure 8:
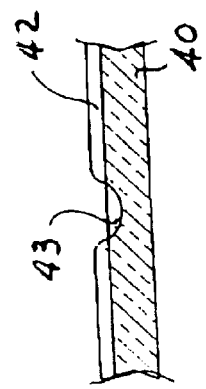
FIG. 8 is a sectional view along line 8—8 of FIG. 6.
Figure 6:
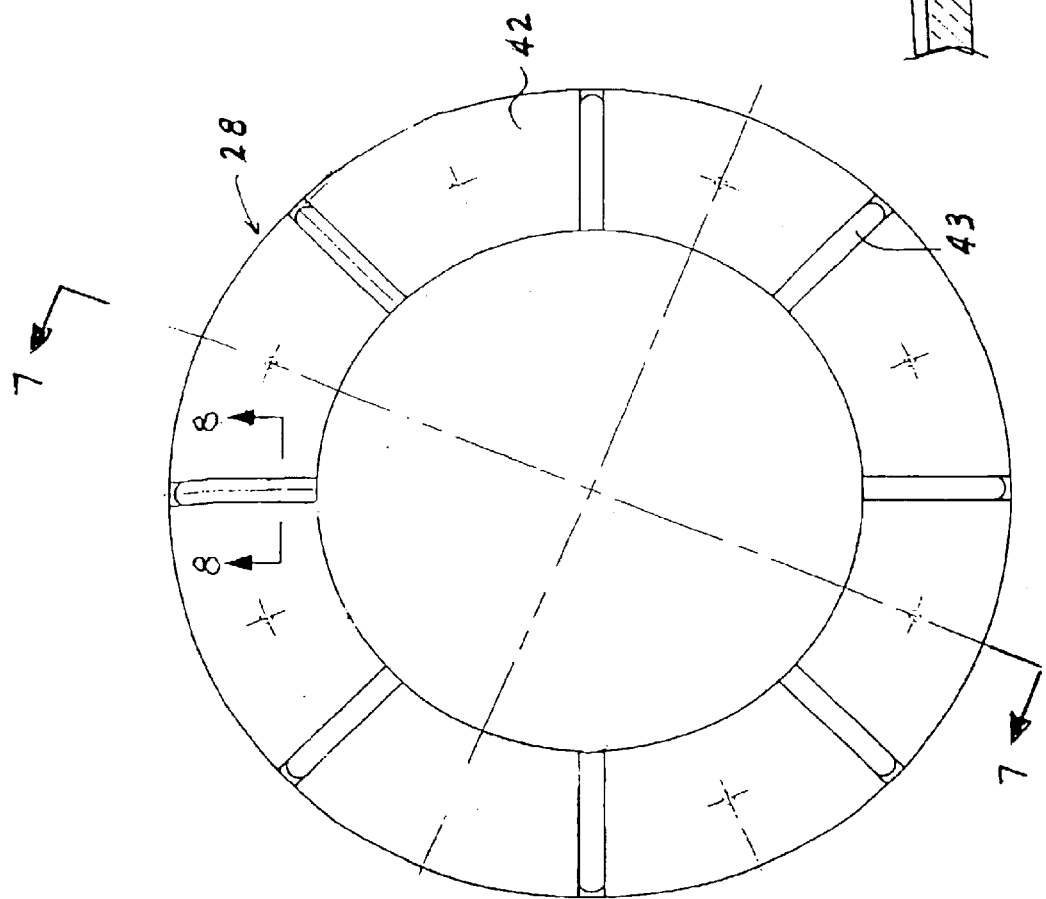
FIG. 6 is a plan view of a second thrust bearing.

The aft thrust bearing 28, details of which can be seen in FIGS. 6, 7 and 8, is made in the same way as forward thrust bearing 27 and differs only in size. Thus it has a central bronze core 40, a front facing layer 42 made from a marine bearing material such as THORDON SXL® and a self-aligning backing layer made of a high resilience polymer such as THORFLEX®. The front face 42 also includes radial grooves 43 providing flow passages for lubricating water.

Figure 9:
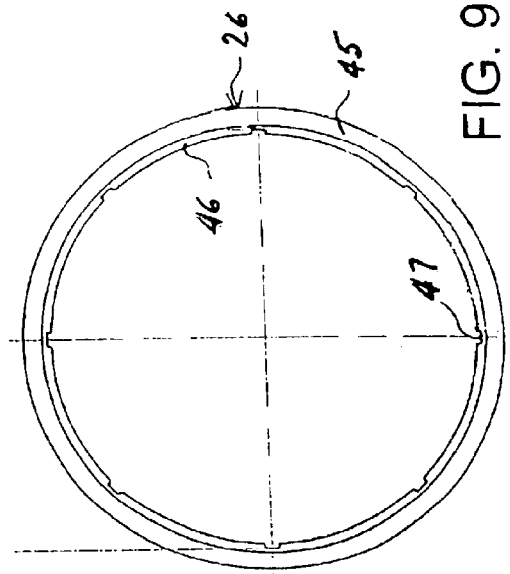
FIG. 9 is an end view of a journal bearing.

Details of the sleeve bearing 26 are shown in FIG. 9 and it includes a bronze housing 45 and an inner layer 46 of polymer marine bearing material, e.g. THORDON SXL®. The inner layer has a series of spaced grooves in the axial direction for supplying lubricating water being fed from line 30. Sleeve bearing 26 is held in place by annular plate 32.

Figure 13:
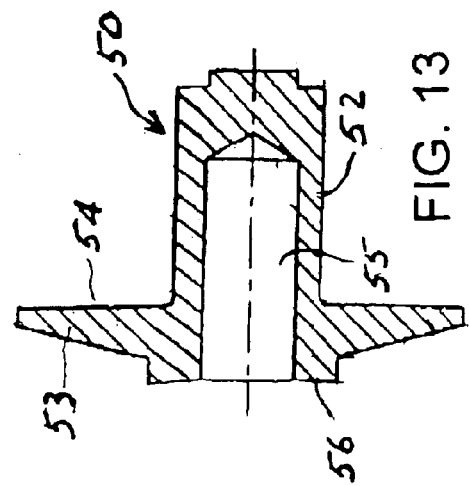
FIG. 13 is a sectional view of a second design of drive shaft extension and thrust flange.
Figure 14:
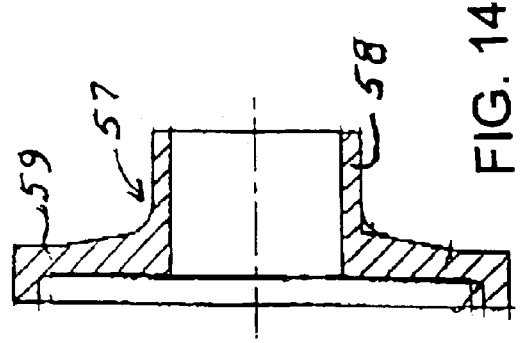
FIG. 14 is a sectional view of an annular housing that mates with the flange of FIG. 13.
Figure 12:
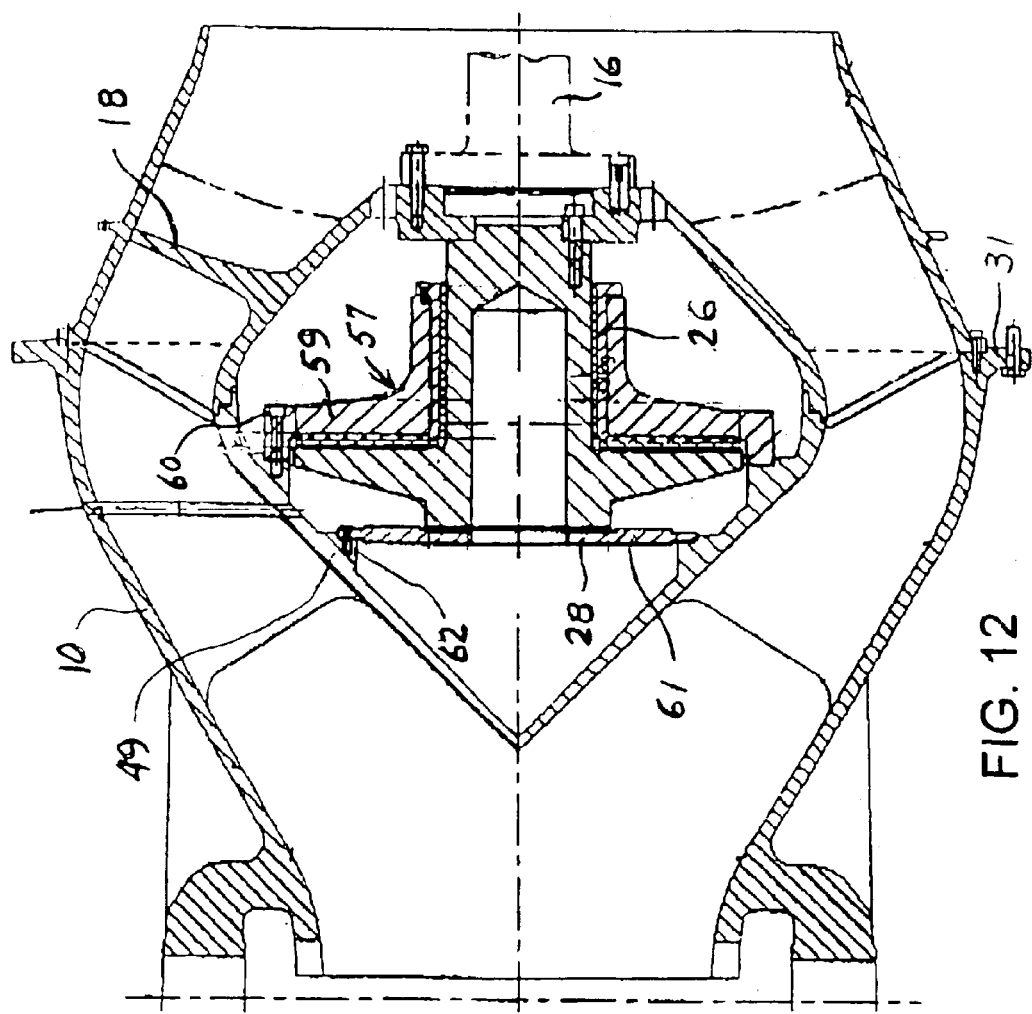
FIG. 12 is a sectional view along a horizontal plane of a second design of thrust bearing assembly.

FIGS. 12, 13 and 14 show an alternative arrangement of the drive shaft extension and mounting of the aft thrust bearing. The outer housing 10, drive shaft 16 and its mounting to impeller 18 are essentially the same as that shown in FIG. 1A. The fixed inner hub 49 is also similar to the fixed inner hub in FIG. 1A. However, in this embodiment, the drive shaft extension 50 has a longer cylindrical portion 52 forward of a thrust flange 53 having a thrust face 54. The drive shaft extension 50 has an axial bore 55 extending in from the aft end and an annular end face 56. A fixed interior housing 57 comprises a sleeve portion 58 formed integrally with a radial flange 59. The sleeve portion 58 fits on the drive shaft extension 50 with sleeve bearing 26 therebetween, while flange 59 is fixed to inner hub 49 by way of bolts 60. The flange 59 includes a cylindrical recess to hold thrust bearing 27. The thrust bearing 27 is connected to housing 57 with the thrust flange thrust face 54 rotating relative to thrust bearing 27.

With this design, the aft thrust bearing 28 is fixed to a support plate 61 mounted on fixed inner hub 49 by way of bolts 62. The bearing face of thrust bearing 28 engages the annular end face 56 of shaft extension 50.

What is claimed is:

1. A fluid thrust apparatus which comprises:
    a flow-through housing having a fluid inlet at one and a fluid outlet nozzle at the opposite end and a central axial pod mounted within the flow-through housing,
    a first portion of said pod comprising a fixed hub supported in the housing and surrounded by an annular fluid flow passage and a second portion of said hub comprising an impeller fixed to a drive shaft with an end of said drive shaft rotatably mounted within said fixed hub, said impeller being adapted to force fluid through the annular fluid flow passage and out through the outlet nozzle, and
    bearing means within said fixed hub for supporting the drive shaft including an axially mounted sleeve bearing and at least one thrust bearing adapted to engage a radial face of a radial flange fixed to said drive shaft,
    said thrust bearing comprising an annular multi-layer plate including a metallic core layer with a front layer of polymeric marine bearing material fixed to one side thereof and a resilient backing layer fixed to the other side thereof, said back layer being formed of a resilient polymeric material and having sufficient resilience to permit corrective alignment of the thrust bearing in response to misalignment or by unevenly distributed thrust.

2. A fluid thrust apparatus according to claim 1 wherein the fixed hub is mounted within the housing by way of a series of radial vanes extending between the hub and the inner wall of the housing.

3. A fluid thrust apparatus according to claim 2 which comprises a watercraft jet propulsion system.

4. A fluid thrust apparatus according to claim 3 wherein the fixed hub comprises a conical shell tapered in the aft direction within which is fixed a bearing support assembly, said support assembly including a collar portion aft of the drive shaft radial flange for retaining a sleeve bearing carrying said drive shaft, a first support assembly radial flange connected to said collar on the aft side of the drive shaft radial flange and retaining a first aft thrust bearing, and a second support assembly radial flange positioned forward of the drive shaft radial flange and connected at the outer periphery to said first support assembly radial flange, said second radial flange retaining a second forward thrust bearing.

5. A fluid thrust apparatus according to claim 4 wherein both said forward and aft thrust bearings have a series of radial grooves on the front layer thereof and connected to a water conduct for supplying lubricating water between said front layer and drive shaft radial flange.

6. A fluid thrust apparatus according to claim 5 wherein the sleeve bearing comprises a cylindrical metal housing having on the inner face thereof a layer of polyurethane, said polyurethane layer having a series of axially extending grooves therein and a water conduit for supplying lubricating water to said grooves.

7. A fluid thrust apparatus according to claim 4 wherein the first support assembly radial flange is fixed to the conical shell.

8. A fluid thrust apparatus according to claim 3 wherein the fixed hub comprises a conical shell tapered in the aft direction within which is fixed a bearing support assembly, said support assembly including a collar portion forward of the drive shaft radial flange for retaining a sleeve bearing carrying said drive shaft, a support assembly radial flange joined to said collar portion adjacent the forward side of said drive shaft radial flange and retaining a forward said thrust bearing adjacent said drive shaft radial flange, said support assembly radial flange being fixed at its outer periphery to said conical shell, and a support plate fixed to said conical shell aft of said drive shaft radial flange and supporting a said thrust bearing adjacent the aft end of said drive shaft.

9. A fluid thrust apparatus according to claim 8 wherein said support assembly radial flange has an outer rim surrounding the drive shaft radial flange.

* * * * *